United States Patent

Hagen

[11] Patent Number: 6,108,172
[45] Date of Patent: Aug. 22, 2000

[54] ONE PIECE FLEXURE FOR A HARD DISC FILE HEAD WITH SELECTIVE NICKEL PLATING

[75] Inventor: Tracy Michael Hagen, Edina, Minn.

[73] Assignee: Seagate Technology, LLC, Scotts Valley, Calif.

[21] Appl. No.: 08/965,946

[22] Filed: Nov. 7, 1997

Related U.S. Application Data

[62] Division of application No. 08/782,978, Jan. 14, 1997, Pat. No. 5,879,570.

[51] Int. Cl.[7] .............................. G11B 5/48; G11B 21/16
[52] U.S. Cl. ...................................... 360/245.2; 360/245.8
[58] Field of Search .................................. 216/22, 39, 49, 216/56, 100; 360/245.2, 245.8

[56] References Cited

U.S. PATENT DOCUMENTS

| | | | |
|---|---|---|---|
| 3,931,641 | 1/1976 | Watrous | 360/104 |
| 4,141,050 | 2/1979 | Wiseley | 360/104 |
| 4,701,659 | 10/1987 | Fujii et al. | 310/334 |
| 4,740,657 | 4/1988 | Tsukagoshi et al. | 174/88 R |
| 4,781,791 | 11/1988 | Simeth et al. | 156/659.1 |
| 4,902,607 | 2/1990 | Lee | 430/323 |
| 4,953,834 | 9/1990 | Ebert et al. | 267/160 |
| 5,006,946 | 4/1991 | Matsuzaki | 360/104 |
| 5,124,864 | 6/1992 | Matsuzaki | 360/104 |
| 5,136,359 | 8/1992 | Takayama et al. | 357/65 |
| 5,166,847 | 11/1992 | Zak | 360/104 |
| 5,215,608 | 6/1993 | Stroud et al. | 156/64 |
| 5,223,997 | 6/1993 | Uemura et al. | 360/103 |
| 5,268,068 | 12/1993 | Cowell et al. | 156/644 |
| 5,304,460 | 4/1994 | Fulton et al. | 430/311 |
| 5,353,181 | 10/1994 | Frater et al. | 360/104 |
| 5,392,179 | 2/1995 | Sendoda | 360/104 |
| 5,526,205 | 6/1996 | Aoyagi et al. | 360/104 |
| 5,612,841 | 3/1997 | Johnson | 360/104 |
| 5,665,251 | 9/1997 | Robertson et al. | 216/22 |

*Primary Examiner*—David Davis
*Attorney, Agent, or Firm*—Flehr Hohbach Test Albritton & Herbert LLP

[57] ABSTRACT

A chemically etched metallic head flexure device and method of fabrication for a head/gimbal assembly having at least one strategically plated surface. The chemically etched flexure device includes a protected surface and an exposed etched surface which are oriented relative one another to form at least one generally sharp edge therebetween. A metallic plated layer is provided which is formed on the exposed etched surface in a region adjacent the protected surface in an amount sufficient to substantially cover or reduce the sharpness of the sharp edge. Hence, transducer wires which contact the plated edge will not be nicked or cut by the edge during extended operation.

10 Claims, 3 Drawing Sheets

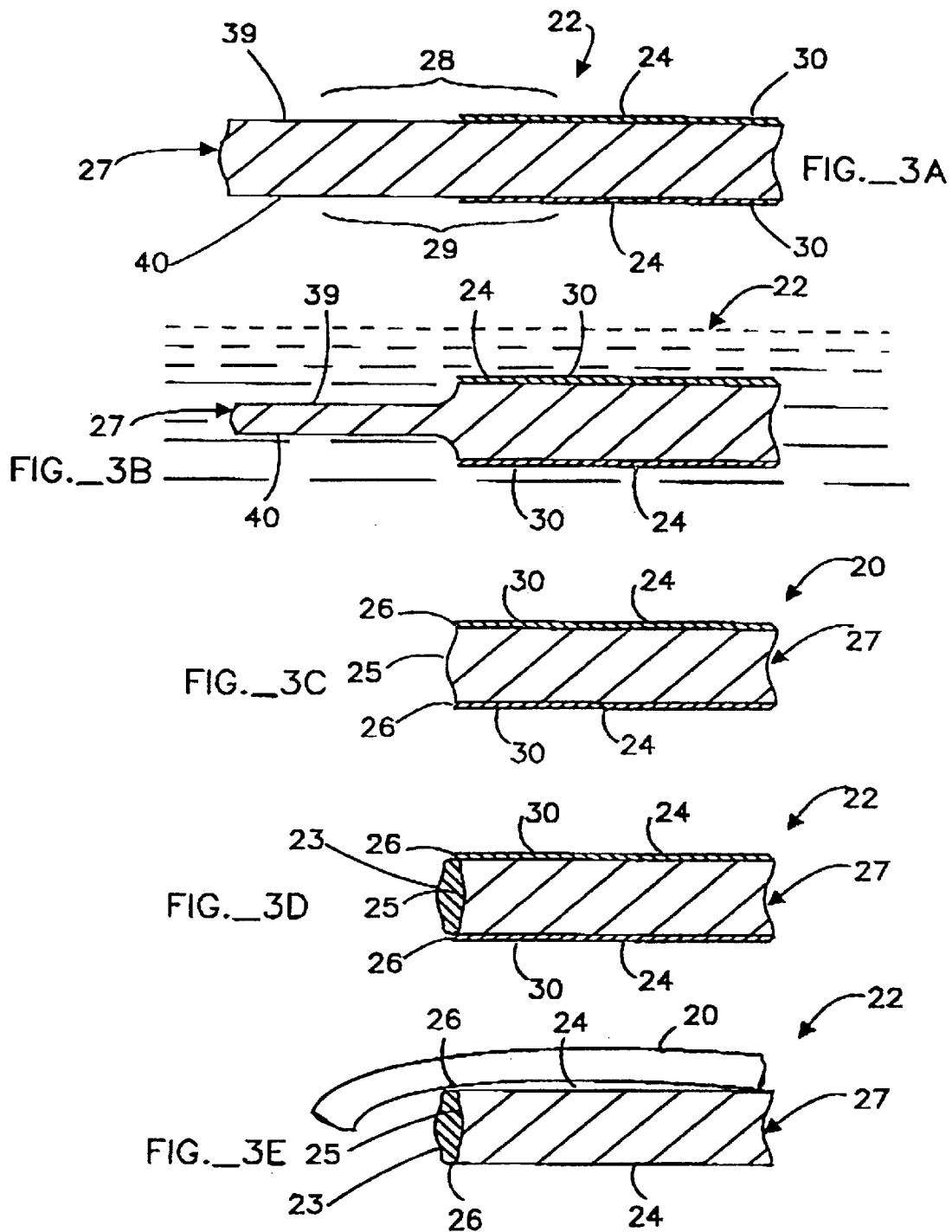

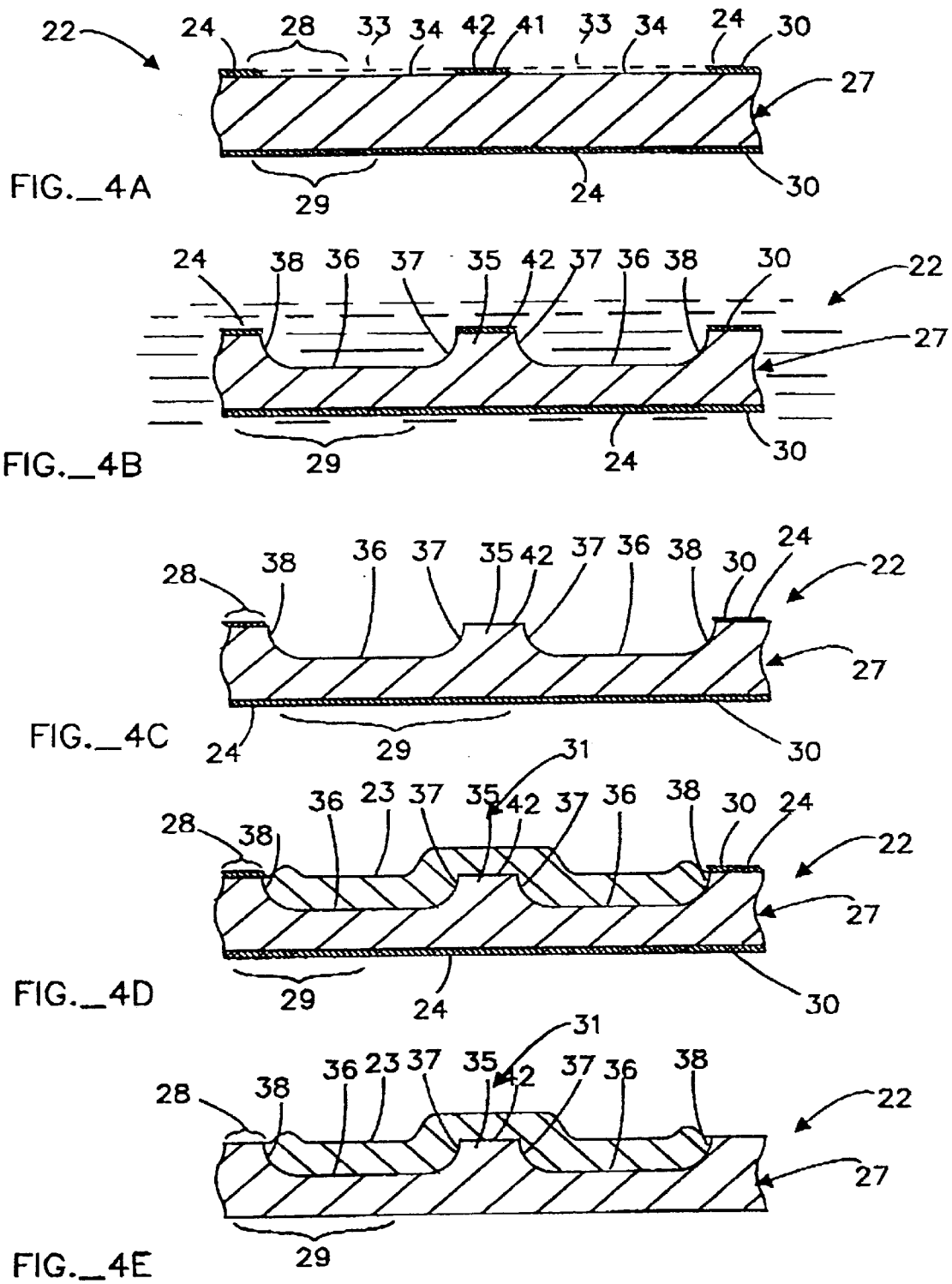
FIG._4A
FIG._4B
FIG._4C
FIG._4D
FIG._4E

ONE PIECE FLEXURE FOR A HARD DISC FILE HEAD WITH SELECTIVE NICKEL PLATING

This is a divisional, of application Ser. No. 08/782,978 filed Jan. 14, 1997 now U.S. Pat. No. 5,879,570.

FIELD OF THE INVENTION

The present invention relates, generally, to disc drive apparatus, and, more particularly, relates to one piece flexures for a hard disc file head.

BACKGROUND OF THE INVENTION

In rotating, non-removable data disc storage devices, a plurality of recording heads are provided, generally of the order of one head per disc surface. Each recording head has an electromagnetic transducer that records data on to a magnetic disc in concentric, circular tracks. It is desirable to provide the disc storage device with high data storage capacity, and one way of providing high capacity is to increase the number of discs in the storage device, generally achieved by manufacturing the discs to a very reduced thickness. It is also desirable to record data at high densities through the means of high frequency data patterns, high track densities, or both. It is also desirable to transfer data from the disc storage device to the host computer at as high a transfer rate as possible. Clearly, one way of increasing the data transfer rate is to rotate the discs at a very high frequency. In order to prevent abrasive wear of the head, or disc surface, or both, the recording head is provided with a self-acting hydrodynamic air bearing. The recording head is also provided with gimbal/suspension structure, which allows the head to freely follow undulations of the disc surface, a condition exacerbated by reduced disc thickness, without interfering with the performance of the air bearing, while at the same time maintaining accurate radial alignment of the electromagnetic transducer to the data track.

Considering the exemplary head/gimbal assembly (HGA) shown in FIGS. 1 and 2 supported over a disc surface segment, it is desirable to maintain rigidity of the slider 11 in the yaw and in-plane directions of the disc 13, while being resilient in the vertical, and pitch and roll directions to enable tracking of the topography of the disc. This is accomplished by the head/gimbal assembly (HGA) 14 of the hard disc file which consists of three components; the slider 11, the gimbal 15 and the load beam 16.

As set forth above, the slider 11 flies upon an air cushion or self-acting hydrodynamic bearing in extremely close proximity to the disc data surface 12. Further, the slider supports the electromagnetic transducer 10 for recording and retrieving computer data from a spinning magnetic disc. Electrical signals are sent and received from the transducer via very small, twisted copper wires.

The gimbal 15, which is coupled to the slider 11, provides resiliency to the slider's pitch and roll directions allowing the slider to follow the topography of the disc, while being rigid in the yaw and in-plane directions for maintaining precise slider positioning relative the data surface.

Finally, the load beam 16, which couples the gimbal 15 to a support arm 17, is resilient in the vertical direction to, again, allow the slider to follow the topography of the disc, and is rigid in the in-plane direction for precise slider positioning relative the data surface. The load beam 16 also supplies a downward force to counterbalance the hydrodynamic lifting force developed by the slider's air bearing.

Together, the load beam and gimbal comprise an assembly generally known as a head suspension or a head flexure, or simply as a flexure 18. Typical of these patented flexures are disclosed in U.S. Pat. No. 4,167,765 to Watrous and U.S. Pat. No. 4,245,267 to Herman.

In flexures such as in the '765 patent, a load point 21 is formed in the slider bonding surface of the gimbal. The downward force caused by the load beam 16 is applied directly to the load point 21. In order to have the slider fly above the disc with the correct attitude, it is more important that the forces and moments created by the hydrodynamic air bearing be properly balanced into equilibrium. It has been found that applying the load beam force to the slider via a gimbal load point guarantees proper flying attitude, since the balance point for the slider's air bearing is well-defined.

Historically, the gimbal 15 and load beam 16 have been fabricated discretely by chemically etching 300 series stainless steel foil into the desired shape. Subsequently, these discrete pieces are coupled together by laser welding or the like. While this arrangement has proven adequate to fabricate the individual pieces, other problems have arisen as a result of the etching process.

Briefly, in the chemical etching process, the stainless steel foil is first coated with photoresist which is a light sensitive liquid polymer. Initially, the foil sheets are dipped into a liquid photoresist bath for a predetermined amount of time achieve a desired film thickness. Once the photoresist is of the desired thickness, the next step performed is known as patterning or developing which entails registering a photo mask over each side of the foil, and then exposing the mask to a light source. This exposure affects the solubility of the photo-sensitive components of the resist to developer solutions.

After completing the development step, the foil sheet will then be composed of areas of exposed stainless steel and areas of photoresist, and will be ready for chemical etching. In this process, the foil is exposed to an etchant such as ferric chloride. Typically ferric chloride is sprayed onto the foil for a controlled amount of time, and then the foil is rinsed. Following rinsing the photoresist is stripped by use of a special chemical solvent.

The chemical etching process is well known for producing very detailed parts having very crisp and well defined features. During etching, some of the ferric chloride undercuts the photoresist pattern such that a sharp edge or corner, such as edge 19, is formed between the two adjacent or common edges which intersect at an angle between 60 and 90 degrees. While these sharp edges 19 of the etched part are desirable from the point-of-view of consistency and repeatability, these edges are problematic in several respects.

The primary problem with sharp edges 19 is that the wires 20 from the transducer 10 to the amplifier must, unfortunately and unavoidably, route near or around one or more of such sharp edges. Since the copper wire is softer than the stainless steel of the flexure, the transducer wires can be easily nicked or cut if they come in contact with an etched edged. This is a continual cause of manufacturing defects of HGAs, and an occasional cause of head failures in hard disc files out in the field.

Another problem with two-piece flexures is the high cost of manufacture. Welding the two discrete components requires precision alignment fixturing, and careful handling of the delicate components in and out of the fixturing, since the parts are easily damaged. Welding also requires a well-controlled laser system that is capable of producing strong welds with minimal distortion to the structure from residual stress.

The fabrication of one-piece flexure assemblies often eliminate the load point feature to simplify manufacture. Typical of these one-piece flexures is described in the '267 patent. Another example is a one-piece flexure known as HTI Type 16, or T-16, manufactured by Hutchinson Technology, Inc. Neither of these one-piece flexures includes a well-defined load point. As a result, the flying height of sliders attached to these flexures vary widely and undesirably during operation.

One unitary flexure having a load point is described in U.S. Ser. No. 07/975,352 filed Nov. 12, 1992 entitled "ONE-PIECE FLEXURE FOR SMALL MAGNETIC HEADS" by Hagen, and U.S. Ser. No. 08/432,843 filed May 2, 1995 entitled "FLEXTURE WITH REDUCED UNLOAD HEIGHT FOR HARD DISC DRIVE HEADS" by Hagen. These flexures have what is known as an etched load point to provide the well-defined balance point. Local to the etched load point on both inventions is some degree of out-of-plane cold forming to elevate the load point relative to the rest of the flexure. The cold forming process is well known, consisting of a precision male and female stamping dies that receive flat components, and stress the components beyond the yield point at selected locations. Because the forming process has a high degree of variance, it is generally necessary to target the elevation of the load point after forming sufficiently high to guard against worse case conditions. But this is disadvantageous since the overall height of the flexure is also increased, which ultimately limits the reduction of the spacing between adjacent discs in a multiple disc drive.

Moreover, since the load points of these flexures described in the above incorporated applications have been made by etching, the inner perimeter of the load point plateau is, of course, a sharp edge. The sliders are generally made from aluminum-oxide titanium-carbide which is harder than stainless steel, and therefore resistant to damage from the flexure. Nevertheless, the sharp edges of the etched load point remain a concern.

A further problem with the current flexure manufacturing process relates to the control of static attitude, which is the orientation of the surface that the slider is bonded to relative to other principal flexure datums. It has been found that one of principal factors causing variation in flying height is the variation in static attitude. Moreover, recent studies have determined that the static attitude variance of the head/gimbal assembly (HGA) is primarily caused by the static attitude variance of the flexures.

Verifying the static attitude on HGAs can easily be done by reflecting a helium-neon laser beam against the slider's air bearing surface while the HGA is clamped to a reference datum. The HGA's air bearing surface is polished to a mirror finish which enables the laser to reflect with little dispersion of the beam.

Unfortunately, inspecting static attitude variance of the flexure is more difficult than with the HGA. This is due to the fact that the finish of the flexure is much more coarse since the foils employed to fabricate the flexure have a rolled finish with grain lines. Thus, the inspection of flexure static attitude requires more complicated equipment, that often has poor through-put. Further, as the roughness of the surface increases, the measurement to determine the plane of a surface becomes more uncertain and less reproducible.

SUMMARY OF THE INVENTION

Accordingly, it is an object of the present invention to provide a chemically etched head flexure device and method for use with a disc drive assembly which substantially reduces damage to internal wires thereof.

Another object of the present invention is to provide a head flexure device and method which substantially suppresses or prevents contact with the sharp edges thereof created from the chemical etching process.

Still another object of the present invention is to provide a head flexure device and method which can be unitarily fabricated with a load point in a simple manner.

Yet a further object of this invention is a head flexure device and method which enables a more reliable measurement of the static attitude variance of the flexure.

It is a further object of the present invention to provide a head flexure device and method for use with a disc drive assembly which is durable, compact, easy to maintain and has a minimum number of components.

In accordance with the foregoing objects, the present invention provides a metallic head flexure device for a head/gimbal assembly having a proximal end coupled to a support arm and a mounting portion coupled to a slider device. The metallic device includes at least one strategically plated surface having a protected surface and an exposed etched surface chemically etched therein by a chemical etching process. The protected surface and the etched surface are oriented relative one another to form at least one generally sharp edge therebetween. A metallic plated layer is provided which is formed on the exposed etched surface in a region adjacent the protected surface in an amount sufficient to substantially reduce the sharpness of the sharp edge.

More specifically, the etched device is formed as a head flexure for a head/gimbal assembly of a disc drive having a proximal end coupled to a support arm and a mounting portion coupled to a slider device. An etched edge of the etched flexure is plated to substantially reduce the sharpness thereof. Hence, transducer wires which contact the plated edge will not be nicked or cut by the edge during extended operation.

Also taught herein is a chemically etched metallic device and method of fabrication thereof, the method including the steps of: chemically etching a device, from a metallic core piece, having a surface area including an exposed etched surface and a protected surface. The protected surface is resistant to a chemical etching process due to a photoresist layer pre-applied thereon. The exposed surface and the protected surface cooperate and are oriented relative one another to typically form at least one generally sharp edge therebetween. The method further includes the step of bathing the etched device in a plating bath to deposit and plate on the exposed etched surface, in a region adjacent the protected surface, a metallic plated layer in an amount sufficient to substantially reduce the sharpness of the sharp edge.

Preferably, the exposed surface includes an etched groove portion chemically etched in the protected surface. The groove portion includes an interior perimeter wall defining a dimple portion of the protected surface. In this arrangement, before the bathing step, the method further includes the step of removing a photoresist dimple pattern defining the dimple portion so that a continuous metallic plated dimple layer is formed on and over the etched groove and the dimple portion. Hence, during the bathing step, a plated protuberance portion is formed in a continuous manner which extends vertically above the first surface.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawing, in which:

FIGS. 3A–3E are a sequence of side elevation views, in cross-section, of the fabrication of a flexure device constructed in accordance with the present invention.

FIGS. 4A–4E are a sequence of side elevation views, in cross-section, of the fabrication of a load point protuberance for the flexure device of FIGS. 3A–3E.

DETAILED DESCRIPTION OF A PREFERRED EMBODIMENT

Figure 1:
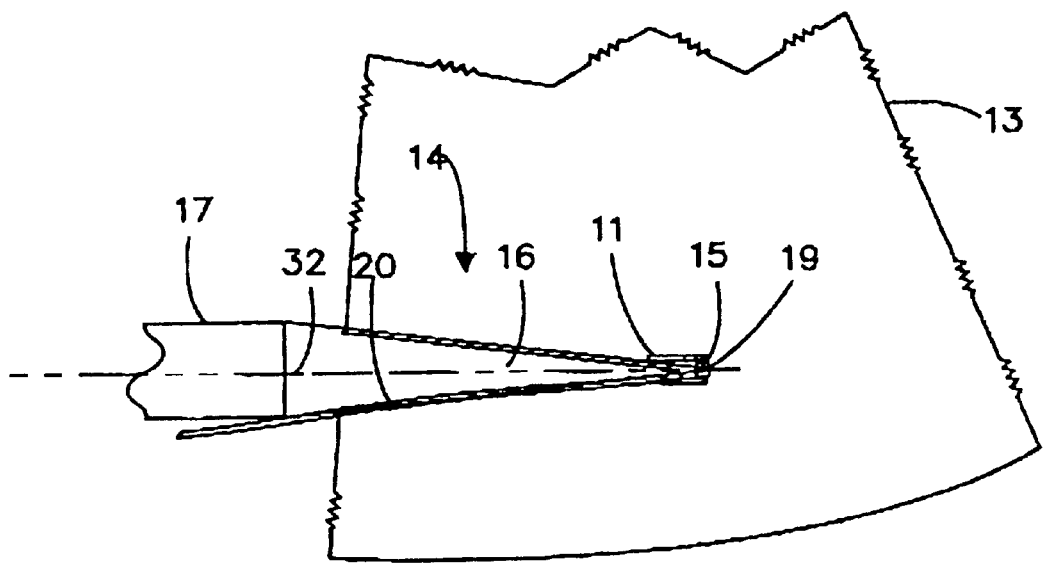
FIG. 1 is a fragmentary top plan view of a prior art head/gimbal assembly coupled to a disc drive assembly.
Figure 2:
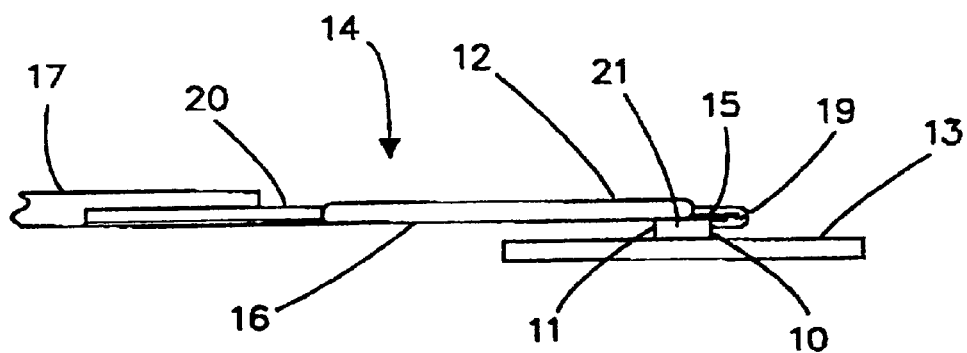
FIG. 2 is a fragmentary side elevation view of the prior art head/gimbal assembly of FIG. 1.

While the present invention will be described with reference to a specific embodiment, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 3A–3E, where the present invention provides a metallic device, generally designated 22, which includes at least one strategically plated surface 23. The metallic device includes an exterior surface having a protected surface 24 and an exposed etched surface 25 chemically etched therein by a chemical etching process. The protected surface 24 and the etched surface 25 are oriented relative one another (i.e., from 60 degrees to 90 degrees) to form at least one generally sharp edge 26 therebetween. A metallic plated layer, generally designated 23, is provided which is formed on the exposed etched surface 25 in a region adjacent the protected surface 24 in an amount sufficient to substantially reduce the sharpness of the sharp edge 26.

Accordingly, for chemically etched structures, the present invention provides an effective solution for preventing contact of a wire with the etched edge. This is accomplished by introducing an insulating plated layer therebetween. Such a technique is particularly useful and important in the electronics industries where chemical etched components often contact communication wires. Those components formed from thin foil sheets, such as head flexure devices for a head/gimbal assembly of a disc drive, are particularly damaging due to the increased sharpness of the etched edges.

In the preferred embodiment, the metallic device is a head flexure for a head/gimbal assembly of a disc drive having a proximal end coupled to a support arm and a mounting portion coupled to a slider device. Hence, the head flexure is initially chemically etched from a sheet foil core piece 27 where the exterior surface includes a first surface 28 and an opposite second surface 29 (FIG. 3A).

After conventional registration of the photo mask and exposure to a light source, the foil sheet core piece 27 is ready for etching. As shown in FIGS. 3A and 3B, some of the photoresist material 30 is removed, leaving exposed selected surface portions 39, 40 of first and second surfaces 28, 29, respectively. Upon chemical etching with an etchant, such as ferric chloride, the exposed surface portions 39, 40 are eventually etched away leaving the exposed etched surface 25, while the protected surface under photoresist layer 30 remains unaltered.

Once rinsed of etchant, the newly etched metallic device 22 is deposited in a plating bath for the formation of the plated layer on the exposed etched surfaces 25. Adhesion of the plated material to the etched surface 25 is particularly good due to the etching characteristics.

The head flexure 22 of the present invention is preferably formed from stainless steel foil sheets, whereupon after etching, the stainless steel portions of the flexure exposed from the etching process have been plated over by another metal such as nickel. By retaining the photoresist layer 30 on the desired protective surface, only the exposed etched surfaces of the etched device will be plated since the photoresist prevents exposure of the protected surface to the plating bath.

The plating or secondary metal plated on the exposed edges is preferably provided by nickel. This material, once alloyed with other metals such as phosphorus, exhibits mechanical properties similar to 300 series stainless steel, such as similar densities, thermal expansion coefficients and moduli of elasticity. Moreover, this heat treated nickel—phosphorus is non-magnetic and has excellent corrosion resistance. Nickel—phosphorus also exhibits very high hardness, typically exceeding an $HV_{100}$ index of 1000. Lastly, the phosphorus is also a natural lubricant which aids in lowering the coefficient of friction.

The preferred plating method is electroless plating, although electroplating could be used. As additional layers of nickel are plated on to the exposed etched surface 25 of the etched device 22, the sharp edge 26 becomes more radiused (FIG. 3) until the sharp corners are plated over or sufficiently covered. The thickness of the plated layer is of course controlled by the duration of the plating bath. It will be appreciated, however, that while the thickness of the plated nickel layer only need be as thick as necessary to suppress the sharpness of and cover the sharp edge 26, the preferred thickness of the plated nickel layer 23 along the exposed etched surface 25 of the etched device is approximately equal to the thickness of the foil.

After the etched surface 25 is plated, the photoresist protective covering 30 may be removed through conventional techniques, such as removal through chemical solvents. Once the flexure is operably installed in a disc drive, future contact with transducer wires 20 or the like (FIG. 3E) will have substantially less likelihood of being nicked, cut or damaged.

It should also be apparent that the overall size surface area of the etched device 22 will increase during the course of nickel plating. Further, features such as tooling holes will be decreased, and would require that these plated holes be etched in a secondary step following plating. Alternatively, the size of the tooling hole during the etching step should be appropriately compensated for.

In another aspect of the present invention, a flexure load point protuberance, generally designated 31 in FIGS. 4A–4E, may be fabricated using the plating technique of the present invention. In the preferred form, this protuberance 31 is located in a plane extending through a longitudinal axis 32 of the load beam, similar to the prior art flexure of FIG. 1.

In accordance with the present invention, after application of photoresist layer 30 to the exterior surface of core piece 27, a photo mask is registered on the selected surfaces in a conventional manner. In particular, a dimple photoresist pattern 33 is registered in the photoresist layer 30 atop first surface 28. This photoresist dimple pattern 33 is preferably annular or donut-shaped having an inner diameter and an outer diameter.

As best viewed in FIG. 4A, after exposure or development of the mask to a light source, an annular surface portion 34 of first surface 28 is exposed which will be subject to chemical etching. Under a dimple photoresist layer 41 of the photoresist layer 30 is a dimple surface of first surface 28 protected from etching by layer 41. Upon etching, a dimple portion 35 is formed which is defined by an annular-shaped etched groove 36 (FIGS. 4B and 4C) which is etched in the first surface 28 of etched metallic device 22. This annular-shaped groove 36 is provided by a circular interior perimeter wall 37 and a circular exterior perimeter wall 38. It will be appreciated, however, that other groove shapes can be employed without departing from the true spirit and nature of the present invention.

In the preferred embodiment, the etched dimple portion 35 is 0.002 inches or less in diameter (i.e., interior perimeter wall 37) within a relieved area 0.010 to 0.020 inches in diameter (i.e., exterior perimeter wall 38). Further, the depth of relieved area or etched groove portion 36 is preferably about 45 percent to about 75 percent of the original foil thickness, and most preferably about 60 percent of the original foil thickness.

Following etching and rinsing, the dimple portion 35 (FIG. 4C) may or may not be covered by photoresist layer 41. If the photoresist mask used to define photoresist pattern 41 has a very small diameter, then during the etching process the chemical etchant will remove the photoresist due to undercutting. The resulting dimple portion 35 will then be generally in the shape of a cone, and devoid of dimple surface 42. Alternatively, if the photoresist mask used to define photoresist pattern 41 has a diameter approaching 0.002, then the resulting dimple portion 35 will have dimple surface 42 covered and protected by photoresist dimple layer 41. This photoresist layer is then removed, preferably by laser vaporization.

FIG. 4D illustrates that after removal of the photoresist dimple pattern 33, a continuous metallic plated dimple layer 23 is plated in the exposed groove 36 or relieved area, and up and over the dimple portion 35 to form the load point protuberance 31. The thickness of the plated dimple layer 23 is approximately the same as the depth the relieved area created during etching. Hence, the depth of the etched groove and the thickness of the plated dimple layer are preconfigured to equate to a vertical height similar to that of the first surface. It will be understood then that load point protuberance 31 will be elevated a desired height above the general plane of first surface 28 of the flexure by a selected amount approximately equal to the depth of the etched groove 36.

Subsequently, the remaining photoresist is removed by using conventional chemical solvents, as shown in FIG. 4E.

One advantage of the present invention plating method is that the operation can be monitored during the process to ensure tighter control on finished load point height. In contrast, the forming method cannot, practically speaking, be monitored during the drawing operation. Moreover, the finished load point protuberance 31 made by plating is also free of sharp edges, thereby eliminating the concern of the load point possibly scratching the slider.

In another aspect of the present invention, as is readily apparent from the above description, a method of fabrication of a chemically etched metallic device 22 is provided including the steps of: chemically etching a device 22, from a metallic core piece 27, which includes an exterior surface area including an exposed etched surface 25 and a protected surface 24. The protected surface 24 is resistant to a chemical etching process through a photoresist layer 30 pre-applied thereon. The etched surface 25 and the protected surface 24 cooperate and are oriented relative one another to form at least one generally sharp edge 26 therebetween. The method further includes the step of bathing the etched device 22 in a plating bath to deposit and plate on the exposed etched surface 25, in a region adjacent the protected surface, a metallic plated layer 23 in an amount sufficient to substantially reduce the sharpness of the sharp edge 26.

The bathing step, as mentioned, is preferably accomplished by electroless plating. After the bathing step, the method of the present invention preferably includes the step of removing the photoresist layer 30 from the protected surface 24, which is performed by a chemical solvent. Further, before the etching step, the method includes the step of applying a light sensitive liquid polymer to the exterior surface of the core piece 27 by dipping the core piece in a liquid photoresist bath in a controlled manner.

To pattern the photoresist, the present invention includes the steps of: after the application step and before the etching step, registering a photo mask on a portion of the exterior surface of the core piece; exposing the mask to a light source, and developing the photoresist to remove the areas of photoresist that were exposed to light.

In accordance with the preferred embodiment of the present invention, recessed surface 36 is chemically etched in to the unprotected surface 34. The recessed surface, as shown in FIGS. 4A–4E, includes an interior perimeter wall 37 defining a dimple portion 35 of the protected surface 24. In this arrangement, before the bathing step, the method further includes the step of removing a photoresist dimple pattern 33 defining the dimple portion 35 so that a continuous metallic plated dimple layer 23 is formed on and over the etched groove 36 and the dimple portion. Hence, during the bathing step, a plated protuberance portion 31 is formed in a continuous manner which extends vertically above the first surface 28.

In another embodiment of the present invention, the flexure static attitude can be measured. This is first accomplished by relieving or half-etching a small region, about 0.010 to 0.030 inches in diameter, located proximate an adhesive bonding surface of the flexure's gimbal tongue. This half-etching is the same process applied to load point protuberance relieve area exposing the first surface 28 around the dimple portion 35.

After this area for static attitude is relieved, the exposed etched surface is plated with the plated layer. In the preferred form, electroless nickel plating is preferred since this technique yields a more uniform and flatter surface than can be realized with electroplating. This is particularly important since this plated surface will serve as a reflective target for laser inspection of flexure static attitude.

It should be apparent that the method of using laser light to verify static attitude can now be done at flexure level by aiming the laser at the plated target in much the same way that the laser is used at HGA level by aiming it at the slider's air bearing surface.

What is claimed is:

1. A flexure for supporting a slider having a transducer thereon to an actuator in a disc drive storage device, the flexure having a proximal end coupled to a support arm;

a mounting portion coupled to said slider for supporting the transducer, the flexure having at least one strategically plated surface comprising:

a protected surface and an exposed etched surface chemically etched therein by a chemical etching process, said protected surface and said etched surface combined and oriented relative one another to form at least one generally sharp edge therebetween; and a metallic plated layer primarily formed on the exposed etched surface in a region adjacent the protected surface in an amount sufficient to substantially reduce the sharpness of said sharp edge, said plated layer disposed over said sharp edge is positioned for contact with a transducer wire supported on said flexure to run to said transducer.

2. A device as defined in claim 1 wherein, said metallic plated layer being deposited and plated on the exposed etched surface during a plating process and while a photo resistant material was disposed on said protected surface to resist chemical etching and plating thereon.

3. A device as defined in claim 1 wherein, said protected surface includes a generally planar first surface and an opposite generally planar second surface separated at one edge by said etched surface therebetween to form a thin sheet-like device.

4. A device as defined in claim 3, wherein, said metallic plated layer is deposited and plated on the exposed etched surface during a plating process and while a photo resistant material was disposed on said protected surface to resist chemical etching and plating thereon.

5. A device as defined in claim 4 wherein, said metallic device is provided by stainless steel, and said metallic plated layer is provided by nickel.

6. A device as defined in claim 1 wherein, said plated layer disposed over said etched edge are positioned for contact with a transducer wire mounted to said slider device, said load point protuberance is provided by an etched groove chemically etched in said first surface, and having an interior perimeter wall defining a dimple portion of said first surface, said protuberance further including a continuous metallic plated dimple layer formed on and over the etched groove and said dimple portion in a manner forming a plated protuberance portion extending above said first surface, said slider resting pivotally against said protuberance without being scratched thereby.

7. A device as defined in claim 6 wherein, the depth of said groove is about 45% to about 75% of the distance from said first surface to said second surface.

8. A device as defined in claim 7 wherein, the depth of said groove is about 60%.

9. A device as defined in claim 7 wherein, said groove is annular-shaped having an inner diameter and an outer diameter.

10. A device as claimed in claim 6 wherein said load point protuberance is defined solely by said plated layer of a first thickness rising above a surface of said flexure, said dimple being surrounded by an annulus of said metallic plated layer.

* * * * *